Aug. 18, 1953   J. G. LENTA   2,649,028
REARVIEW MIRROR
Filed Feb. 2, 1951

INVENTOR.
JOSEPH G. LENTA
BY
Richard P. Cardew
AGENT

Patented Aug. 18, 1953

2,649,028

UNITED STATES PATENT OFFICE 2,649,028

REARVIEW MIRROR

Joseph G. Lenta, Duluth, Minn.

Application February 2, 1951, Serial No. 209,130

2 Claims. (Cl. 88—87)

This invention relates to a rear view mirror for use on automobiles and the like, and has special reference to an improved construction for a mirror having a plurality of separate and independent faces.

In present day automobiles, trucks, and the like, a great deal of special attention is being given to improving driver vision, to the side and rear, as well as to the front. New cars have rear and side windows so styled and arranged that a rider has almost unobstructed vision in all directions. However, the driver of the automobile has only his conventional rear view mirror for his rearward vision, and he must turn his head to see to either side of the car.

In my United States Patent No. 2,214,639, I have shown a rear view mirror for automobile use, particularly, which has three independently adjustable viewing faces which provide greatly improved driver vision to both sides of and to the rear of a car or the like. However, the structure disclosed in this patent has proven too expensive to manufacture commercially. Also, the ball and socket joints employed do not give sufficient flexibility of movement.

It is, therefore, one of my principal objects to provide an improved construction for a multiple-face rear view mirror which is simple and inexpensive to manufacture.

Another object is to provide such a device which is readily adjustable to provide any desired viewing angles and which is neat in appearance.

Another object is to provide a rear view mirror which is efficient in its operation.

These and other objects and advantages will become more apparent as the description of the invention proceeds.

In the drawing accompanying and forming a part of this application:

Figure 1:
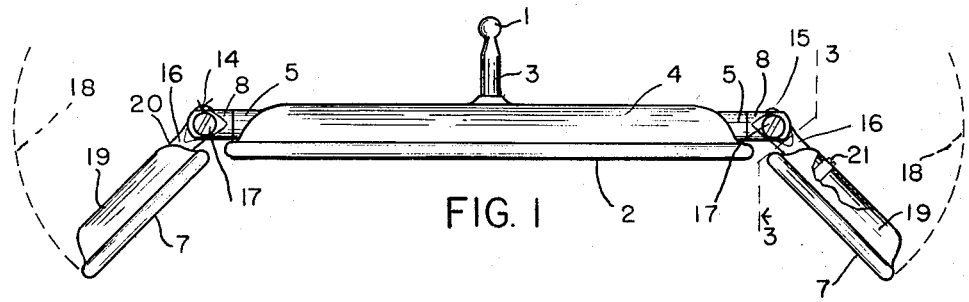
Fig. 1 is a top plan view, partly in section, of one of my rear view mirrors.

In the drawing, the reference numeral 1 indicates a common ball which is carried in a suitable socket, not shown, to provide a mounting for the mirrors on a support, such as a windshield. Obviously, the socket mentioned would be secured to the support and the ball 1 would be frictionally held therein to permit vertical and lateral adjustment of the major mirror 2. This structure and operation is, of course, old in the art and needs no further mention here.

The ball 1 is carried on a stem 3 which is fixed to rear face the housing 4 of the mirror 2, as shown. The mirror 2, in its operation, is the same as a conventional rear-view mirror, except that at the rear thereof a pair of opposed sockets 5—5 are provided, these sockets being horizontally alined adjacent the vertical side edges 6 of the mirror 2. I have here shown the opposed sockets 5—5 as being the opposite ends of a length of tubing 6 which extends across the rear of the mirror 2 and through the housing 4. The tube 6 provides a convenient pair of sockets, and also serves to make the assembly and housing of the parts of my device more convenient, as will become apparent.

Figure 3:
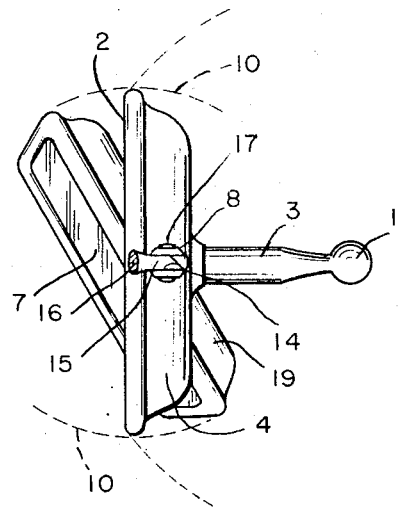
Fig. 3 is a side elevational view on the line 3—3 Fig. 1.
Figure 4:
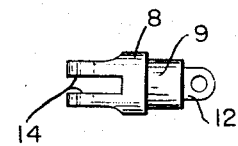
Fig. 4 is a side elevational view of one of the coupling members of my invention.

As means to support the side mirrors 7—7, I provide couplings 8—8, one for each of the side mirrors 7—7. The couplings 8—8 each have a cylindrical hub 9 which extends into its respective socket 5, the hub socket serving to provide the support for side mirrors, as well as to permit the rotation or pivoting of the side mirrors on the axis of the sockets as indicated by the dotted lines at 10, Fig. 3. Each of the couplings 8 also has a perforated lug 12 at its inner end, and these lugs 12 provide a means for attaching a spring 13 to the coupling.

Figure 2:
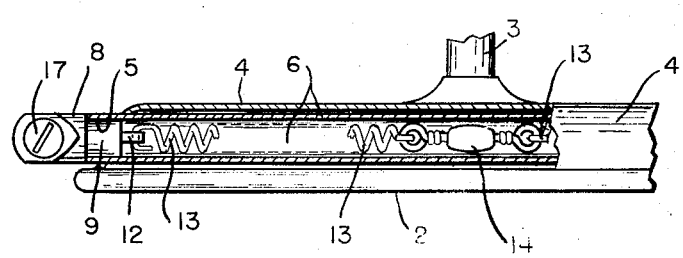
Fig. 2 is a fragmental horizontal sectional view through the housing of the central mirror showing the pivotal and swivel mounting for the side mirrors.

As seen in Fig. 2, there are two springs 13, the springs 13—13 being joined by means of a swivel device 14. (The swivel 14 here shown is of the common construction such as are employed on fishing lines and the like to prevent lines from twisting when rotating fishing lures are used.) The springs 13—13 are of the contractile type and are installed between the lugs under tension so as to tend to pull the couplings 8 toward each other, thereby preventing the hubs 9 from moving out of their sockets 5. Any suitable hook, not shown, may be used to engage the outer end of one of the springs 13, after the other end thereof is connected between the swivel and the coupling, to stretch the springs so that the end engaged by the hook will extend outwardly of its adjacent socket so that the other coupling can be hooked on to the spring. When the springs are released, the couplings will be pulled into and held in their respective sockets, as shown in Fig. 1. It is deemed apparent that the tube 6 makes it much easier to hook up the parts as above described as it confines them to a relatively small convenient space.

The portion of each of the couplings 8 which extends outwardly of the sockets 5 is preferably bifurcated as at 14 to receive the flat end 15 of the lateral supporting stem 16 of the side mirrors 7—7, and a screw or bolt 17 is provided to extend through the coupling and end 15, as shown, to permit the lateral pivoting of the side mirrors as shown in dotted lines at 18.

The supporting stem 16 of the side mirrors 7—7 may be fixed to the housing 19 of the side mirrors, as at 20, or it may extend into the housing 19 and be held in place by a set screw 21. This latter mounting will permit lateral spacing or positioning of the side mirrors with respect to the central mirror 2.

Having thus described my invention, what I claim is:

1. A rear view mirror for automobiles and the like comprising a central mirror, means for pivotally mounting said central mirror on said automobile, a pair of side mirrors, and means for mounting one of said side mirrors on each side of said central mirror whereby they may be pivoted on their longitudinal axes and in a plane normal to said axes, said last mentioned means comprising a pair of opposed sockets on the rear of said central mirror, one of said sockets being carried adjacent each side of said central mirror, said sockets having axially alined bores, a unitary coupling extending into each of said bores, a shoulder on each of said couplings to limit their extension into their respective bores of said sockets, a portion of said couplings being extended outwardly of said sockets, a stem extending from each of said side mirrors toward said central mirror, a hinge connection joining each of said stems to their adjacent outwardly extending portions of said couplings to pivotally support said side mirrors on said central mirror, said hinge connection permitting the pivotal movement of said side mirrors in a plane normal to their longitudinal axes, said couplings being rotatable in said sockets to permit the pivoting of said side mirrors on substantially their longitudinal axes, and a spring connected between said couplings to hold the latter in their desired position within said sockets and to prevent said side mirrors from pivoting on said longitudinal axes unintentionally.

2. A rear view mirror for an automobile or the like comprising a central mirror, means to mount said mirror on said automobile, an elongated tube carried on the back of said mirror and having its opposed ends adjacent the side edges of said mirror, a unitary coupling member axially rotatably carried on each end of said tube, a shoulder on said couplings to limit the movement of said couplings into said tube, springs and a swivel within said tube and being connected together and joining said coupling members to bias said couplings toward each other to maintain same in frictional engagement with said tube to prevent unintentional movement of said couplings axially of said tubes yet permitting independent axial adjustment of said coupling members when intended, a pair of side mirrors, a stem on each of said side mirrors extending toward said central mirror, a hinge connection joining said stems with their adjacent coupling members and serving as the mounting for said side mirrors on said central mirror, said couplings being rotatable within their respective ends of said tube to permit said axial adjustment of said couplings and thereby to accomplish the adjustment of said side mirrors on their longitudinal axes.

JOSEPH G. LENTA.

References Cited in the file of this patent

UNITED STATES PATENTS

| Number | Name | Date |
|---|---|---|
| 1,578,629 | Beauchamp | Mar. 30, 1926 |
| 1,895,560 | Weir | Jan. 31, 1933 |
| 1,980,149 | Zink | Nov. 6, 1934 |
| 1,991,363 | La Hodny et al. | Feb. 19, 1935 |
| 2,320,904 | Bachkai | June 1, 1943 |